United States Patent [19]

Fechner

[11] 4,347,549
[45] Aug. 31, 1982

[54] ANTI-STATIC STRUCTURE FOR MAGNETIC TAPE GUIDES

[75] Inventor: Erno H. Fechner, Redwood City, Calif.

[73] Assignee: Ampex Corporation, Redwood City, Calif.

[21] Appl. No.: 132,715

[22] Filed: Mar. 24, 1980

[51] Int. Cl.³ .............................................. H05F 3/00
[52] U.S. Cl. .................... 361/212; 361/221; 242/197
[58] Field of Search ...................... 361/214, 221, 212; 242/197

[56] References Cited

U.S. PATENT DOCUMENTS

| | | | |
|---|---|---|---|
| 217,557 | 7/1879 | Smith | 361/222 |
| 3,502,284 | 3/1970 | Loewenberg et al. | 361/212 |
| 3,601,654 | 8/1971 | Long | 361/212 |
| 3,857,532 | 12/1974 | Bastiaans | 361/212 |

*Primary Examiner*—A. D. Pellinen
*Assistant Examiner*—L. C. Schroeder
*Attorney, Agent, or Firm*—Charles M. Carman, Jr.; Robert G. Clay

[57] ABSTRACT

A magnetic tape cassette is provided with shielding means for the guide posts thereof, including a clip member of electrically-conducting material, for preventing build-up of static electrical charges and resultant clinging of the tape to the guide posts, when it is desired to pull the tape from the guide posts by vacuum pressure-differential apparatus, as for threading into a tape transport.

3 Claims, 1 Drawing Figure

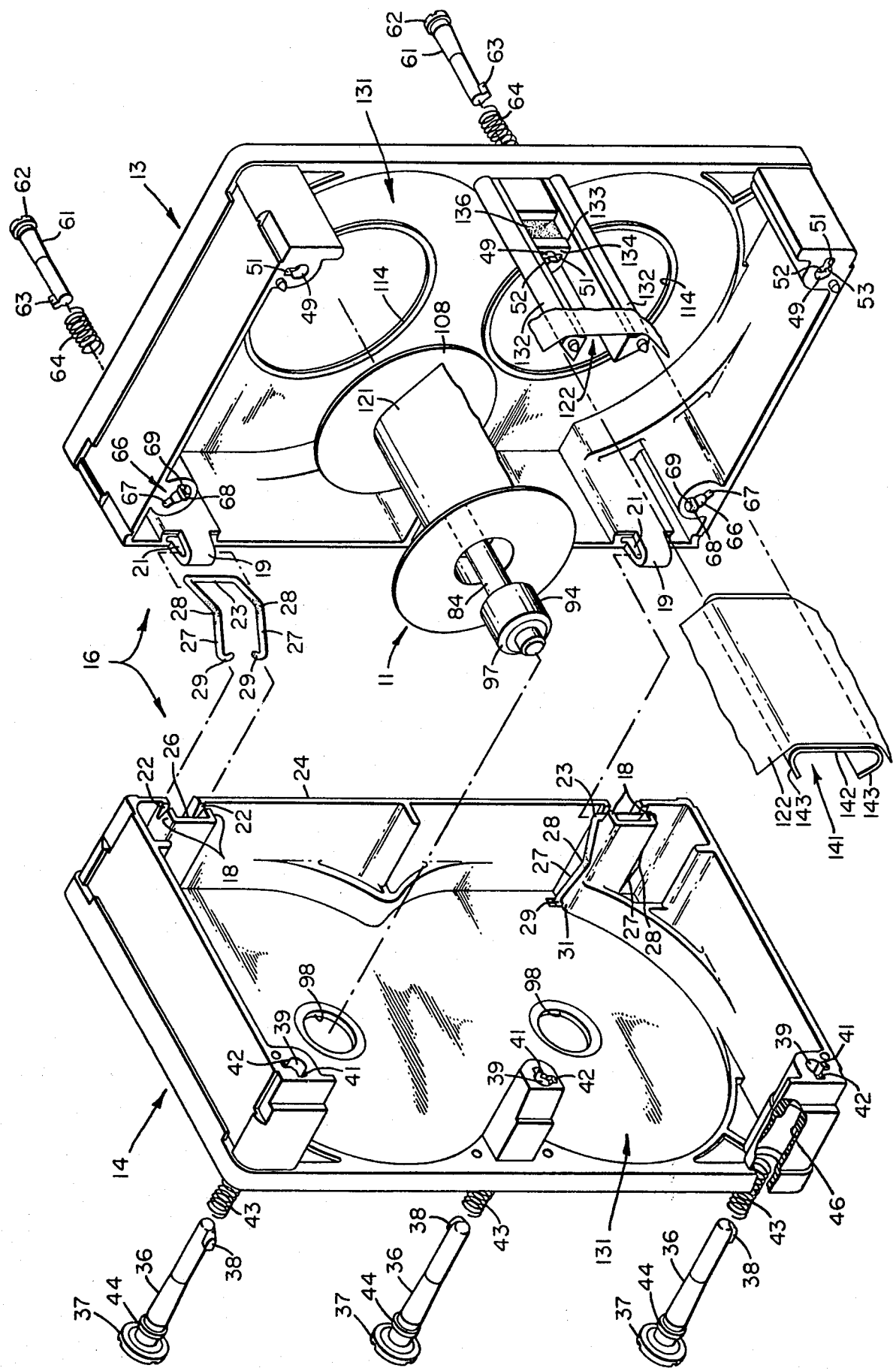

1

ANTI-STATIC STRUCTURE FOR MAGNETIC TAPE GUIDES

BACKGROUND OF THE INVENTION

This invention relates to magnetic tape transport, and particularly to tape guides therefor.

Various synthetic or so-called "plastic" materials have found uses in the economical manufacture of magnetic tape transport and of components therefor, such as the magnetic tape cassette described in U.S. Pat. No. 3,756,329, which is meant for use in an automatically-threading transport mechanism such as the carrousel apparatus disclosed in U.S. Pat. No. 3,720,794.

In the machine of this patent, the tape loop that extends between the two reels of the cassette is pulled into the transport machine, and into contact with the magnetic heads, by means of a vacuum apparatus.

One problem that has developed in the use of plastic materials for such cassettes, is that the surfaces thereof, over which the tape passes in a tensioned, rubbing fashion, and particularly surfaces such as those of guide posts, tend to collect static charges of electricity, so that the tape clings to the guide posts when the tape is at rest. The cassette of U.S. Pat. No. 3,756,329, for example, has a pair of guide posts for holding the tape that extends between the reels of the cassette in a favorable position to be acted upon by the vacuum pressure differential of the transport, for threading. However, the build-up of static electrical charges between the tape and guide posts, and the resulting clinging of the tape to the posts, inhibits and interferes with the desired vacuum-threading operation and, on occasion, causes complete malfunction of the apparatus.

Accordingly, it is an object of the present invention to provide anti-static protection for magnetic tape and the guide means therefor.

It is a further object of the present invention to provide an improved cassette for the threading of magnetic tape into a tape transport.

SUMMARY OF THE INVENTION

A magnetic tape cassette is provided with shielding means for the guide posts thereof, including a clip member of electrically-conducting material, for preventing build-up of static electrical charges and resultant clinging of the tape to the guide posts, when it is desired to pull the tape from the guide posts by vacuum pressure-differential apparatus, as for threading into a tape transport.

DESCRIPTION OF THE DRAWING

The sole FIGURE of the Drawing is an exploded perspective view of a cassette and one of the reels therefor, showing the invention mounted on a guide post element thereof.

DESCRIPTION OF THE PREFERRED EMBODIMENTS

For convenience of illustration, the invention is shown mounted upon the cassette shown in the sole FIGURE of the Drawing, which cassette is substantially the same as that shown in U.S. Pat. No. 3,756,329, and is described as follows.

Referring to the sole FIGURE there is shown one of a pair of reels 11 suitable for winding a short length of magnetic tape of the wide (e.g. 2 inches, or wider, or narrower) video transverse recording type commonly used for "spot announcements" and "commercials" advertisements of several minutes' duration in television broadcasting stations. The reels 11 are normally enclosed in a cassette housing consisting of two substantially equal parts or halves 13,14, which may be broken open for removal or exchange of reel-mounted tape.

To facilitate the opening and closing of the cassette the halves are arranged with hinges 16,17 in each of which the leaves are integrally cast or molded as portions of the high-strength plastic housing halves 13,14, and the knuckles 18,19 define journal means 21,22 for a hinge pin 23.

To facilitate molding the cassettes from plastic, the hinges 16,17 have an unusual construction in that the first or female knuckle 18 is formed as part of a reentrant first wall 24 of the housing half 14 to define a recess 26 opening toward the exterior of the housing and toward the second or male knuckle 19 on half 13. This construction facilitates the production of the knuckle by casting or plastic molding techniques; and the male knuckle 19 is also moldable as a protrusion or extension of housing portion 13 to fit pivotably within recess 26 in both open and closed conditions of the cassette.

To facilitate both the manufacture and operation of the hinges 16,17, the reentrant wall 24 portion of knuckle 18 is slotted to define a pair of bearing slots 22 aligned on the hinge axis and opening toward the other housing portion 13, so as to permit lateral insertion and removal of the hinge pin 23. The pin 23 is formed with its mid-portion fitting in the slots 22, and two substantially parallel arms 27 extend orthogonally from the mid-portion and along the opposed faces 18 of the reentrant first wall portions that face inwardly of the housing. The arms 27 are curved or bent as at 28 and have hook portions 29 at the tips to define a springy clip. Thus, the clip 23, after having been inserted through the journal 21 of male knuckle 19, may be seated in slots 22 of female knuckle 18, and the tip hooks 29 are concurrently hooked, by a slight distortion of springy bent arms 27, around a pair of shoulders 31 that are cast in the walls 18 of the female knuckle. This structure not only facilitates manufacture and assembly of the hinge, but also its operation, for the springy clip 23 retains the two cassette halves in tightly clamped together and snug-fitting relation both in the closed condition of the cassette and during the opening and closing process.

To hold the cassette halves together at points remote from the hinges, there are provided three key-type fasteners 36, each having an enlarged head 37 and a single bit 38. Each of the corresponding keyholes 39 (in part 14 e.g.) is warded to permit insertion and removal axial passage of the key only in a first predetermined orientation, i.e., the orientation illustrated in the FIGURE, which corresponds with a ward slot 41 that passes the entire length of keyhole 39 in part 14. However, once inserted, the key may be turned 90 degrees to a second orientation corresponding with a slot 42 which extends axially along the side of the keyhole only far enough to seat the axial length of bit 38. Thus, in the second orientation the key cannot be removed; and a helical compression spring 43 is provided to seat against a shoulder 44 forming part of the enlarged head portion of the key, and a shoulder 46 on the interior of the keyhole, to urge the key in a removal direction and thus retain it securely with the bit in slot 42.

To fasten the housing parts together by means of the keys 36, the other housing part 13 is provided with matching keyholes 49 that are warded to accept the key bit only in the second orientation thereof, as by means of a single ward slot 51, which passes to an enlarged interior chamber defined in part by a shoulder 52, having a shallow slot 53 therein at a different orientation than slot 51, so that when the key is pushed more deeply inwardly against the resistance of spring 43, it may be rotated to the orientation of slot 53 and seated therein, thus locking the two cassette halves together.

A key type structure is also used for function lockout buttons, such as record lockout and erase lockout, commonly provided in cassettes in the form of punchout holes in the casing, the related function being permitted (or conversely, prevented) by a sensing lever on the transport controls when the punch-out is missing, permitting the sensing lever to intrude into the punch-out recess. In the present invention, no punch-outs are provided, but rather a pair of depressable and restorable keys 61 having enlarged heads 62, single bits 63, and springs 64, fitting in keyholes 66 in a first orientation, as illustrated, corresponding to full-length slots 67, and being seatable in a second orientation in part-length slots 68 with the heads 62 coplanar with the outer surface of the cassette, representing the function-permitted position (or the opposite in some applications). Part-length slots 69 are also provided at a third orientation and at a depth such that when the key is further depressed and the bit is seated in slot 69, the head 62 is recessed substantially below the outer surface of the cassette, this being the function-forbidden position (or the reverse).

Both key heads 37 and 62 may be slotted to aid the use of screwdrivers in operation.

The cassette, of course, contains two reels 11, which may be identical, and only one of which is shown in the drawing, fitting between the upper cassette openings 98, 114. The other reel fits between the lower openings 98, 114. Each reel has a hub spindle 84, a brake member 94 springloaded by a helical compression spring (not shown) to be urged against the portion of the inner face of the wall of cassette half 14 that is peripheral to opening 98, such portion being chamfered to mate with and to centralizing seat a correspondingly bevelled portion 97 of the brake member 94. The reel flange 108 has a stepped extension (not shown) fitting loosely within the opening 114 for centralizing the flange 108 with respect to the opening 114.

In operation, the reels 11 serve to mount a magnetic tape 121, with the reel-to-reel run 122a of tape (shown in phantom lines) looped over a pair of guide posts 132 and exposed to the operation of an air pressure differential, as described in U.S. Pat. No. 3,756,329 previously referred to. Recessed portions 133,134 are provided beneath the tape run 122 to ensure the communication of atmospheric pressure to the tape and to thus assist in the establishment of the required air pressure differential.

When the run 122a of tape is pulled from the cassette by the pressure differential, the tape loses, or should lose, its contact with the guide posts 132, and thereafter, for play-record operation, does not contact any portion of the cassette except the reels 11.

However, during the fast-wind and fast-rewind modes of operation, and to some extent during the unthreading mode, the tape does run frictionally against the guide posts 132, which, as integral parts of the cassette, have been found to be very economically manufacturable, as by molding processes, from hard synthetic or so-called "plastic" substances, which are characterized by the common feature that they collect static electric charges from the frictional running of the tape. Thus when the tape is stopped against the posts 132 it tends to cling to the posts, and often cannot be pulled successfully away by the differential air pressure forces.

To remedy this problem, the present invention provides an anti-static shield in the form of metal or other electrically conducting material to cover the tape bearing portions of the guide posts 132, so as to engage the tape and bleed away static electrical charges before they can build up.

The clip 141 is arrange to enclasp more than a 180-degree sector of the assembly of the two posts 132, so as to be retained thereon without the need for fasteners or adhesives, and means are provided for preventing the clip 141 from rotating on the post assembly, in that the clip 141 is formed to conform to the generally triangular cross-section of the post assembly, and has one flat side 142 for spanning the space between the posts 132 on the tape-confronting side of the post assembly; and the clip also has two rounded apex portions 143 adjacent to the flat side 142, so as to define with the flat side 142 a non-rotating bearing element for engaging the tape.

The shield clip 141 may be made of springy material so as to snap on to the post assembly; but it is here shown as being slipped on to the post assembly from the free end thereof.

Thus there has been described the following apparatus: A magnetic tape cassette, provided with shielding means for the guide posts thereof, including a clip member of electrically-conducting material, for preventing build-up of static electrical charges and resultant clinging of the tape to the guide posts, when it is desired to pull the tape from the guide posts by vacuum pressure-differential apparatus, as for threading into a tape transport.

I claim:

1. An anti-static shield for a tape guide post arranged for confronting only one flat face of said tape, comprising:
   a shield member attachable to said guide post and covering the tape-confronting portions thereof to define a bearing surface for said tape; and
   said shield member being formed of electrically conductive material and being electrically coupled only to said one tape face.

2. A shield as described in claim 1, wherein said post is formed in cylindrical form, and wherein:
   said shield member is formed as a clip for enclasping more than a 180-degree sector of the cylindrical surface of said post; and
   means are provided for limiting rotation of said shield on said post to prevent uncovering of said tape-confronting of said post.

3. A shield as described in claim 2 wherein:
   said post has a generally triangular cross-section defining a portion including one generally flat side and two rounded apex portions adjacent to said flat side; and
   said shield has a shape conforming to said triangular cross-section of said post so as to enclasp said portion of the post including said flat side and said two adjacent rounded apex portions to define a non-rotating bearing element for engaging said tape.

* * * * *